(12) United States Patent
Cha (10) Patent No.: US 7,986,876 B2
(45) Date of Patent: Jul. 26, 2011

(54) METHOD OF INTERVAL PHOTOGRAPHING UNDER A PLURALITY OF PHOTOGRAPHING CONDITIONS AND PHOTOGRAPHING APPARATUS USING THE SAME

(75) Inventor: Sang-hyuk Cha, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/578,655

(22) Filed: Oct. 14, 2009

(65) Prior Publication Data

US 2010/0158498 A1 Jun. 24, 2010

(30) Foreign Application Priority Data

Dec. 18, 2008 (KR) ................. 2008-129398

(51) Int. Cl.
*G03B 17/00* (2006.01)
*H04N 5/225* (2006.01)

(52) U.S. Cl. ...................... 396/265; 348/220.1
(58) Field of Classification Search .............. 396/265; 348/220.1

See application file for complete search history.

(56) References Cited

U.S. PATENT DOCUMENTS
2007/0031139 A1    2/2007    Tsukuda

*Primary Examiner* — Rochelle-Ann J Blackman
(74) *Attorney, Agent, or Firm* — Stanzione & Kim, LLP (57) ABSTRACT

An interval photographing method with a plurality of photographing conditions includes setting at least one interval photographing condition in an interval photographing mode, obtaining an image at regular time intervals according to the at least one set interval photographing condition, classifying the image obtained at the regular time intervals by an index according to the at least one set interval photographing condition and storing the image, and combining the image stored by the index and converting the image into a motion picture.

19 Claims, 7 Drawing Sheets

METHOD OF INTERVAL PHOTOGRAPHING UNDER A PLURALITY OF PHOTOGRAPHING CONDITIONS AND PHOTOGRAPHING APPARATUS USING THE SAME

CROSS-REFERENCE TO RELATED APPLICATIONS

This application claims priority under 35 U.S.C. §119(a) from Korean Patent Application No. 10-2008-129398, filed on Dec. 18, 2008, in the Korean Intellectual Property Office, the disclosure of which is incorporated herein by reference in its entirety.

BACKGROUND

1. Field of the Invention

The present general inventive concept relates to a photographing method of a motion picture photographing apparatus and, more particularly, to interval photographing which photographs an image at regular time intervals set by a user.

2. Description of the Related Art

An interval photographing function of a motion picture photographing apparatus refers to a function that photographs at time intervals set by a user for a short time and finally makes a single motion picture. In general, a user uses such an interval photographing function when he/she wishes to photograph an event which very slowly changes over a long period of time.

The interval photographing generally generates a single motion picture using setting values of the photographing apparatus. The setting values are generally set when photographing is initially performed. However, since the interval photographing may be performed for a long time, the initial setting values become inappropriate with time.

In order to solve this problem, a method of automatically changing a photographing mode with time has been developed. However, the method has a problem in that it does not reflect a user's intention of photographing a change in an environment and further, does not satisfactorily represent such a change in the environment, due to the change in the photographing mode.

SUMMARY OF THE INVENTION

The present general inventive concept provides a method which photographs at time intervals under various conditions, thereby minimizing user error.

The present general inventive concept further provides an interval photographing method, with a plurality of photographing conditions, which photographs at regular time intervals set by a user to obtain a plurality of interval photographing motion pictures having different modes set according to the user's intention.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by an interval photographing method with a plurality of photographing conditions, the method including setting at least one interval photographing condition in an interval photographing mode, obtaining an image at regular time intervals according to the at least one set interval photographing condition, classifying the image obtained at the regular time intervals by an index according to the at least one set interval photographing condition and storing the image, and combining the image stored by the index and converting the image into a motion picture.

The at least one interval photographing condition may include at least one of brightness, aperture value, white balance, and special effect of photography, and the obtaining the image may include obtaining an image at regular time intervals which are calculated based on a maximum time for interval photographing and a real time required to photograph.

The obtained image may be a still image. The obtained image may be a partial motion picture.

The partial-motion picture may be photographed at preset regular time intervals according to the at least one interval photographing condition.

The interval photographing method may further include displaying a maximum number of the at least one interval photographing conditions set by a user.

The maximum number of the at least one interval photographing conditions may be obtained using a maximum photographing interval set by the user and a real time to photograph within the set maximum photographing interval.

The foregoing and/or other aspects and utilities of the general inventive concept may also be achieved by a photographing method, including photographing an image at preset time intervals separately for each of different photographing conditions, and generating a motion picture for each of the different photographing conditions by combining the images photographed according to the same photographing condition.

The photographing may include photographing a still image separately according to each of the different photographing conditions, and the generating the motion picture may include combining still images photographed according to the same photographing conditions.

The photographing may include photographing a partial motion picture separately according to each of the different photographing conditions, and the generating the motion picture may include combining partial motion pictures photographed according to the same photographing condition.

The foregoing and/or other aspects and utilities of the general inventive concept may also be achieved by a photographing apparatus including a photographing unit, and a control unit to control the photographing unit to photograph an image at preset regular intervals separately according to each of different photographing conditions, and generate a motion picture for each of the different photographing conditions by combining the images photographed according to the same photographing condition.

The foregoing and/or other aspects and utilities of the general inventive concept may also be achieved by a photographing method including photographing an image at preset time intervals separately according to each of different photographing conditions, and separately storing the image photographed separately.

The foregoing and/or other aspects and utilities of the general inventive concept may also be achieved by a photographing apparatus including a control unit to determine an interval set according to an interval photographing mode of an event time period and a real time, and a photographing unit to take pictures according to the interval during the event time period to correspond to the real time.

The control unit determines a second interval set according to a second interval photographing mode of a second event time period and second real time, and the photographing unit takes second pictures according to the second interval during the second event time period to correspond to the second real time.

The photographing apparatus includes a storage unit to store the pictures and the second pictures.

The control unit combines the pictures to generate a motion picture, and the second pictures to generate a second motion picture.

The foregoing and/other aspects and utilities of the general inventive concept may also be achieved by a photographing apparatus including a photographing unit to obtain an image at regular time intervals according to at least one set interval photographing condition, a memory to classify the image obtained at the regular time intervals by an index according to the at least one set interval photographing condition, and store the image, and a control unit to combine the image stored by the index and convert the image into a motion picture.

The at least one interval photographing condition may include at least one of brightness, aperture value, white balance, and special effect of photography.

The imaging device may obtain the image at the regular time intervals which are calculated based on a maximum time for interval photographing and a real time required to photograph.

The obtained image may be a still image. The obtained image may be a partial motion picture.

The partial motion picture may be photographed at preset regular time intervals according to the at least one interval photographing condition.

The photographing apparatus may also include a display to display a maximum number of the at least one interval photographing conditions set by a user.

The maximum number of the at least one interval photographing conditions may be obtained using a maximum photographing interval set by the user and a real time to photograph within the set maximum photographing interval.

The foregoing and/other aspects and utilities of the general inventive concept may also be achieved by a photographing apparatus including a camera to photograph an image at preset interval separately according to each of different photographing conditions, and a memory to separately store the image photographed separately.

The foregoing and/other aspects and utilities of the general inventive concept may also be achieved by a photographing apparatus including a photographing unit, and a control unit to control the photographing unit to photograph a still image separately according to each of different photographing conditions, and generate a motion picture for each of the different photographing conditions by combining still images photographed according to the same photographing conditions.

The foregoing and/other aspects and utilities of the general inventive concept may also be achieved by a photographing apparatus including a photographing unit, and a control unit to control the photographing unit to photograph a partial motion picture separately according to each of different photographing conditions, and generate a motion picture for each of the different photographing conditions by combining partial motion pictures photographed according to the same photographing conditions.

The foregoing and/other aspects and utilities of the general inventive concept may also be achieved by a computer-readable recording medium having embodied thereon a computer program that, when executed by a computer, performs a method of photographing, the method including photographing an image at preset time intervals separately for each of different photographing conditions, and generating a motion picture for each of the different photographing conditions by combining the image photographed according to the same photographing condition.

According to the exemplary embodiments of the present general inventive concept, since a plurality of motion pictures can be obtained for each different photographing condition, there is a high possibility that the user can obtain a desired motion picture. Also, the user can obtain and use several motion pictures having various photographing conditions.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Interval photographing refers to a function of a photographing apparatus (e.g., a camera or camcorder) that photographs a changing event which may take place over a long period of time, at regular time intervals in a compressed manner. For example, an event which may take place for a long time, such as flower blooming, insect hatching, and clouds drifting, is photographed at regular time intervals by several frames at a time. Then, if the photographed event is replayed for a desired time, the event which takes place for a long time is shown in several seconds or several minutes in a compressed manner.

In order to perform such an interval photographing function, the time during which the event progresses should be estimated in advance, and a real time during which the photographing is performed (corresponding to a total reproducing time) should be determined. Then, a time interval for interval photographing may be calculated.

For example, if it is estimated that 5 hours is taken until flower buds come into bloom and if a real time required to photograph (reproducing time) is 10 seconds, a photographing interval is set to 1800 seconds (that is, (5 hours×60 minutes×60 seconds)÷10 seconds=18000 seconds÷10 seconds=1800 seconds). Accordingly, the interval photographing is performed for one second every 30 minutes.

Therefore, an interval for the interval photographing may be determined according to an event time period and a target output period. Here, for example, the event time period is 5 hours and the target output period in real time is 10 seconds.

More professional interval photographing may be performed, however, when unit of frames are used, thus requiring more complicated calculation. That is, the calculation becomes more complicated depending on how many frames is required per second to make a motion picture. In the above example, if a motion picture having 30 frames per second is assumed, the photographing interval is set to 60 seconds (that is, 18000 seconds÷(10×30) seconds=60 seconds). Accordingly, the interval photographing is performed by one frame every one minute.

Therefore, an interval for the interval photographing may be determined according to an event time period and the number of frames per second. Here, for example, the event time period is 5 hours and the number of frames per second is 30.

Figure 1:
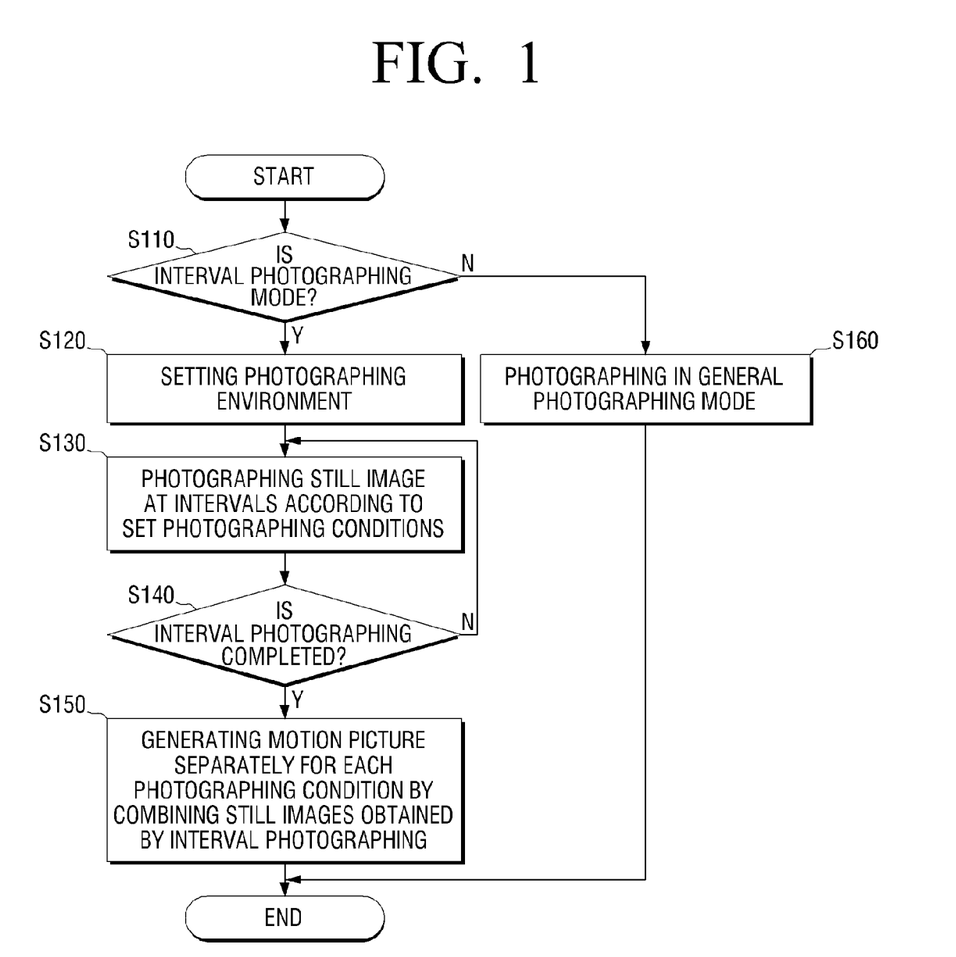
FIG. 1 is a flowchart illustrating an interval photographing method with a plurality of photographing conditions according to an embodiment of the present general inventive concept.

FIG. 1 is a flowchart illustrating an interval photographing method with a plurality of photographing conditions according to an embodiment of the present general inventive concept.

This embodiment relates to an interval photographing method for each still image (frame) and will be described below with reference to FIG. 1.

As illustrated in FIG. 1, it is determined whether a photographing apparatus is in an interval photographing mode or not in operation S110. In the interval photographing mode (operation S110-Y), a photographing environment including at least one photographing condition is set in operation S120. If the photographing apparatus is not in the interval photographing mode (operation S110-N), photographing is performed in a general photographing mode in operation S160.

The photographing environment set in operation S120 includes (1) a maximum time for interval photographing, (2) a real time required to photograph (corresponding to the desired number of frames of a motion picture), and (3) at least one of photographing conditions such as brightness, aperture value, white balance, and special effect.

For example, a user may set three conditions in operation S120. More specifically, the user may set all the camera's functions to 'Auto' as a first condition, set all the camera's functions to specific values as a second condition, and set a special effect (that is, black and white or sepia) as a third condition. A number of interval photographing conditions may be automatically determined by considering a set time interval and an environmental condition, or may be determined by user settings.

A maximum number of photographing conditions may be obtained by setting the maximum photographing interval and the real time required to photograph (the desired number of frames of a motion picture). That is, considering the maximum photographing interval set by the user and the real time required to photograph within the set maximum photographing interval, the maximum number of photographing conditions reflecting the performance of a camera and a memory capacity is displayed. As such, the user may set the number of photographing conditions to as many as he/she desires among the displayed number of conditions.

Then, the interval photographing is performed at regular time intervals in the unit of a still image (frame) according to the set photographing conditions in operation S130.

In the interval photographing operation S130, still images (photo) satisfying the set photographing conditions are photographed and stored according to respective indexes. If the user sets three photographing conditions as described above, three still images are photographed at every interval and each of the photographed still images is stored with a specific index.

If the interval photographing is completed in operation S140-Y, the still images obtained by the interval photographing are combined such that a single motion picture is generated separately for each photographing condition in operation S150. That is, if final photographing is performed (operation S140-Y), the still images which have been stored separately by index are converted into a single motion picture for each photographing condition (operation S150). In this embodiment, three motion pictures are stored.

The operation S150 may include an operation of generating or combining the images obtained in the interval photographing, and an operation of generating a signal representing a motion picture formed by the combined images if there are different photographing conditions with different event time periods and/or target output periods (or number of frames). The operation S150 may further include three signals representing three motion pictures formed by the respective combined images taken according to different conditions.

Since the number of motion pictures which are finally generated by the interval photographing is three, there is a higher possibility that the user may obtain a desired motion picture than in the case where the number of generated motion pictures is one.

The interval photographing method according to an embodiment of the present general inventive concept described above enables a user to obtain a desired motion picture from the interval photographing requiring a long-time recording operation.

Figure 2:
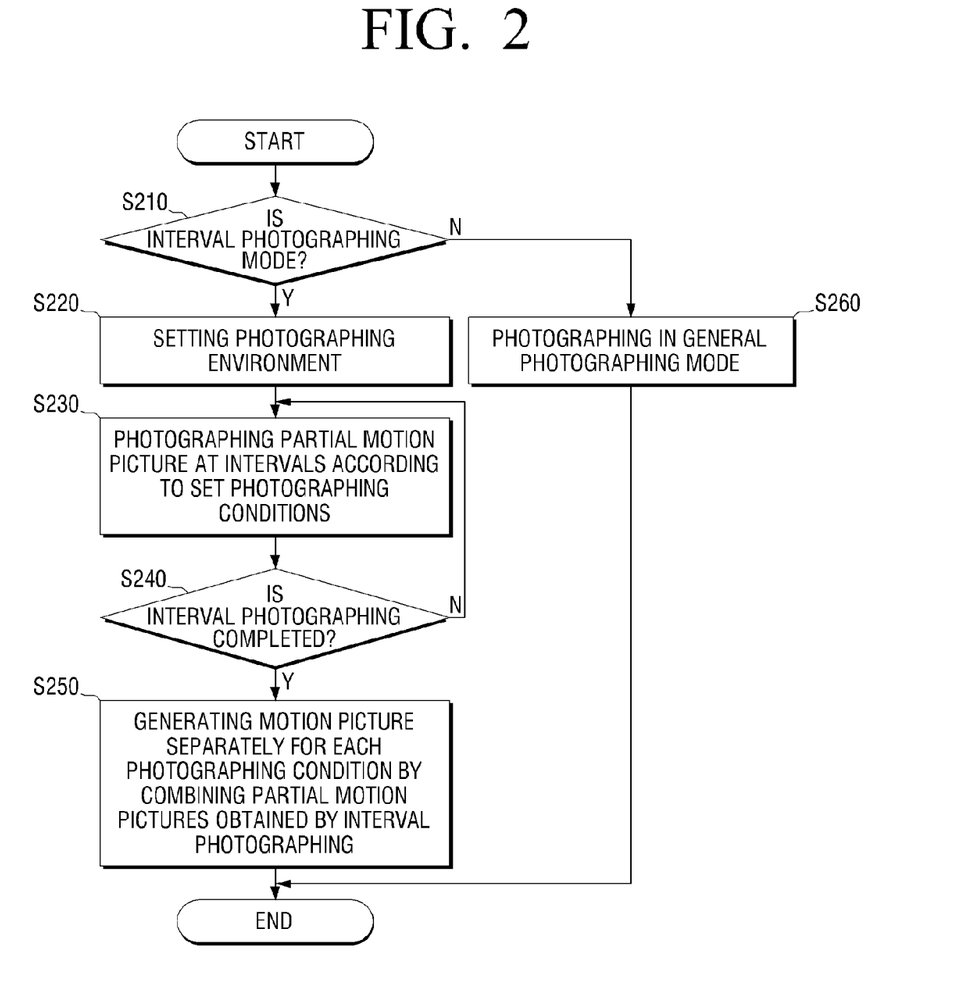
FIG. 2 is a flowchart illustrating an interval photographing method with a plurality of photographing conditions according to another embodiment of the present general inventive concept.

FIG. 2 is a flowchart illustrating an interval photographing method with a plurality of photographing conditions according to another embodiment of the present general inventive concept.

This embodiment relates to a motion picture interval photographing method and will be described below with reference to FIG. 2.

As illustrated in FIG. 2, it is determined whether a photographing apparatus is in an interval photographing mode in operation S210. In the interval photographing mode (operation S210-Y), a photographing environment including at least one photographing condition is set in operation S220. If the photographing apparatus is not in the interval photographing mode (operation S210-Y), photographing is performed in a general photographing mode in operation S260.

The photographing environment set in operation S220 includes (1) a maximum time for interval photographing, (2) a desired time for a motion picture, and (3) at least one of photographing conditions such as brightness, aperture value, white balance, and special effect.

For example, the user may set three conditions in operation S220. The user may set all the camera's functions to 'Auto' as a first condition, set all the camera's functions to specific values as a second condition, and set a special effect (that is, black and white or sepia) as a third condition. A number of interval photographing conditions may be automatically determined by considering a set time interval and environmental condition, or may be determined by user settings.

A maximum number of photographing conditions may be obtained by setting the maximum photographing interval and the real time required to photograph (desired time of a motion picture). That is, considering the maximum photographing interval set by the user and the real time required to photograph within the maximum photographing interval, the maximum number of photographing conditions reflecting the performance of a camera and a memory capacity is displayed. Then, the user may set the number of photographing conditions to as many as he/she desires among the displayed number of conditions.

The interval photographing is performed at regular time intervals in the unit of a partial motion picture according to the set photographing conditions in operation S230. The term 'partial motion picture' is introduced to be discriminated from a motion picture and refers to a motion picture that is obtained if the interval photographing is performed for a specific time. If the partial motion pictures are combined, a motion picture may be generated.

In the interval photographing operation S230, partial motion pictures are photographed at regular time intervals according to the set photographing conditions and are stored according to respective indexes. Unlike the example of the still image as described above, in this embodiment, a partial motion picture is photographed for one minute every 30 minutes. More specifically, a partial motion picture for each index is photographed at time intervals, such as, for example, for one minute every 30 minutes in a first mode, for one minute every 32 minutes in a second mode, and for one minute every 34 minutes in a third mode. In this embodiment, three partial motion pictures are photographed at every interval.

The reason why a partial motion picture is photographed at a different time slot is that three still images are photographed without interval, whereas a motion picture cannot be photographed simultaneously. Accordingly, the photographing is performed at different time intervals for each mode, and since the image photographed for one minute every 30 minutes has a value similar to the image photographed for one minute every 32 minutes, there is no great change in the photographed image due to the time difference.

Then, if the interval photographing is completed in operation S240-Y, the partial motion pictures which have been obtained by interval photographing are combined such that a single motion picture is generated separately for each photographing condition in operation S250. That is, if final photographing is performed in operation S240-Y, the partial motion pictures stored for each index are converted into a single motion picture for each photographing condition (operation S250). In this embodiment, three motion pictures are stored.

Figure 3:
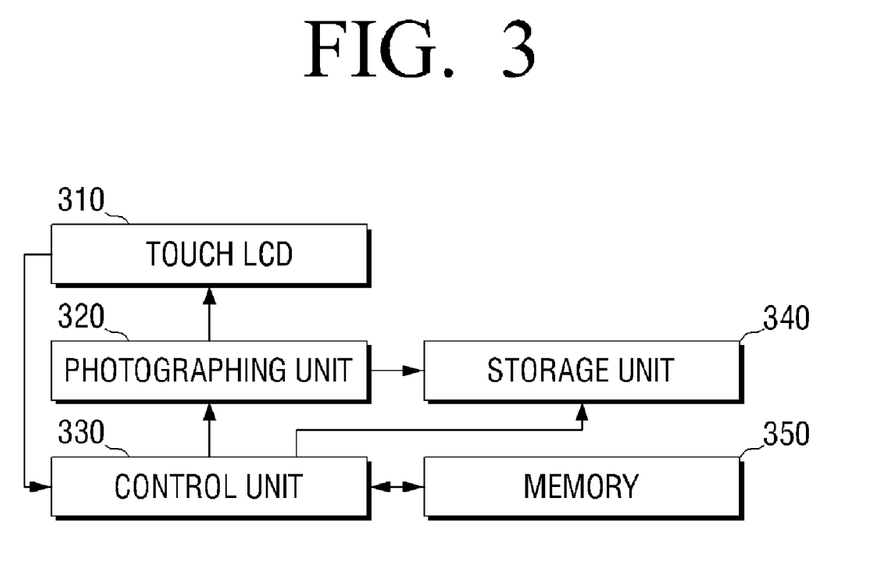
FIG. 3 is a block diagram illustrating a photographing apparatus according to an embodiment of the present general inventive concept.

FIG. 3 is a block diagram illustrating a photographing apparatus according to an embodiment of the present general inventive concept.

As illustrated in FIG. 3, a photographing apparatus includes a touch liquid crystal display (LCD) 310, a photographing unit 320, a control unit 330, a storage unit 340, and a memory 350.

The photographing unit 320 photographs a subject and a background which enter through a lens to obtain an image. The image photographed by the photographing unit 320 is displayed on the touch LCD 310.

The touch LCD 310 may serve as a user interface to receive a command from a user. Among the images photographed by the photographing unit 320, an image which is instructed to be stored is stored in the storage unit 340.

The memory 350 is a storage medium that temporarily stores still images and partial motion pictures which are generated in interval photographing operation.

The control unit 330 performs the photographing method described above with reference to FIGS. 1 and 2. The control unit 330 controls the touch LCD 310, the photographing unit 320, and the storage unit 340, and uses the memory 350 as a storage space.

More specifically, if the photographing apparatus is set to be in the interval photographing mode, the control unit 330 controls the photographing unit 320 to photograph according to the photographing environment. Then, if the interval photographing is completed, the control unit 330 combines the motion pictures which have been generated by interval photographing separately for each photographing condition, generating a motion picture, and thus, stores the generated motion picture in the storage unit 340.

Figure 4:
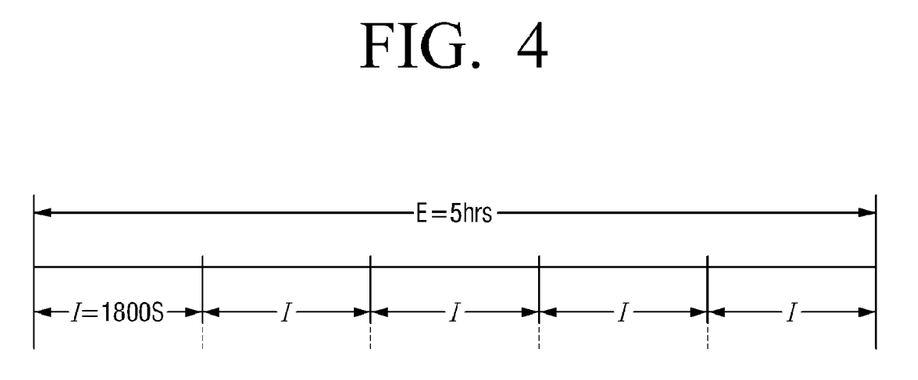
FIG. 4 is a perspective view illustrating an interval photographing according to an embodiment of the present general inventive concept.

FIG. 4 is a perspective view illustrating an interval photographing according to an embodiment of the present general inventive concept.

As illustrated in FIG. 4, for example, an event time period E for flower buds to come into bloom may be estimated at 5 hours. As described above, if a real time required to photograph is 10 seconds, the photographing interval I is set to 1800 seconds.

Figure 5:
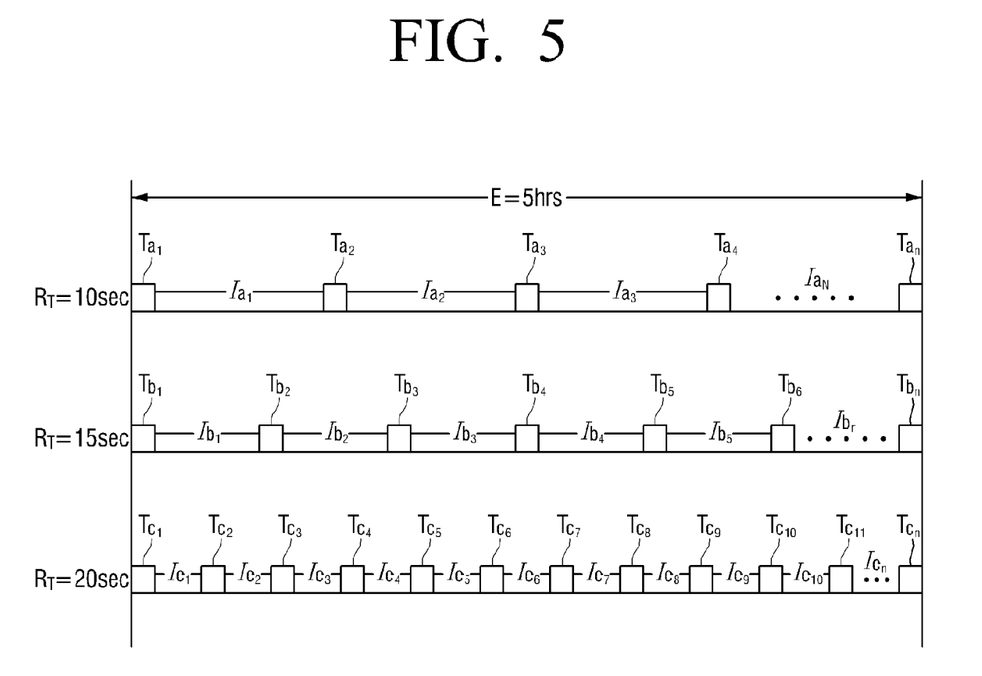
FIG. 5 is a perspective view illustrating an interval photographing according to an embodiment of the present general inventive concept.

FIG. 5 is a perspective view illustrating an interval photographing according to an embodiment of the present general inventive concept.

As illustrated in FIG. 5, for example, the event time period E is 5 hours and the real time required $R_T$ to photograph is 10 seconds. If a motion picture having 30 frames per second is assumed, as described above, 300 frames (that is, (10 seconds×30 frames/second) are required to make a 10 second motion picture. If a real time required $R_T$ to photograph is 15 seconds and 30 frames per second are assumed, a motion picture may require, for example, 450 frames. If a real time required $R_T$ to photograph is 20 seconds and 30 frames per second are assumed, a motion picture may require, for example, 600 frames.

The event time period E for the first mode of $R_T$, 10 seconds may be different from other event time periods E for other modes of $R_T$, 15 seconds and $R_T$, 20 seconds.

Figure 6:
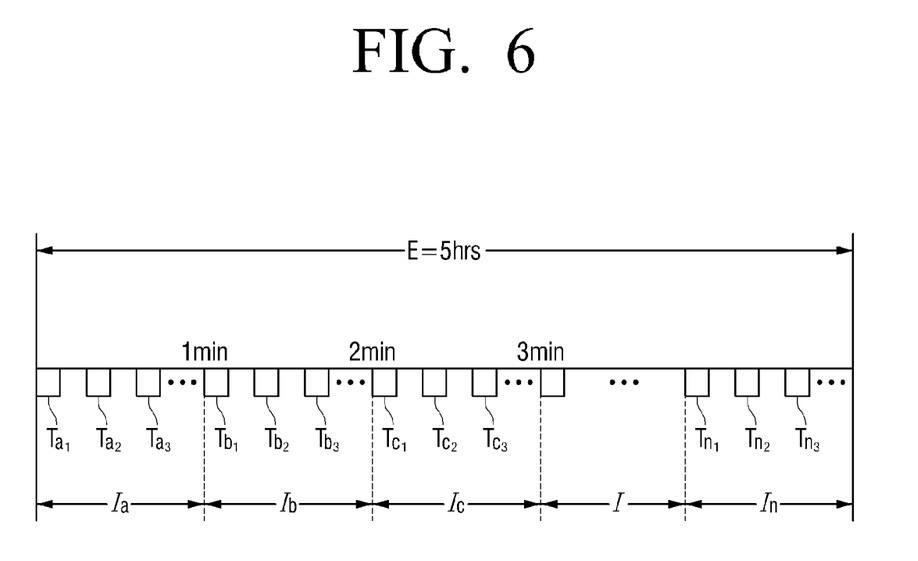
FIG. 6 is a perspective view illustrating an interval photographing according to an embodiment of the present general inventive concept.

FIG. 6 is a perspective view illustrating an interval photographing according to an embodiment of the present general inventive concept.

As illustrated in FIG. 6, for example, if a motion picture having 30 frames per second is assumed, the photographing interval may be set to 60 seconds as described above. As such, the interval photographing is performed by one frame $Ta_1$, $Tb_1$, $Tc_1$, ... $Tn_1$ every 60 seconds (1 minute) interval Ia, Ib, Ic, ... In. As shown in FIG. 6, the user may set at least one photographing condition in the photographing interval. For example, interval $Ta_1$ may include at least one photographing condition, that is, $Ta_1$ is a first condition, $Ta_2$ is a second condition, and $Ta_3$ is a third condition. By combining, for example, all frames $Ta_1+Tb_1+Tc_1+Tn_1$, a motion picture $M_1$ may be produced according to the first condition. By combining, for example, all frames $Ta_2+Tb_2+Tc_2+ \ldots Tn_2$, a motion picture $M_2$ may be produced according to the second condition. By combining, for example, all frames $Ta_3+Tb_3+Tc_3+ \ldots Tn_3$, a motion picture $M_3$ may be produced according to the third condition.

Figure 7:
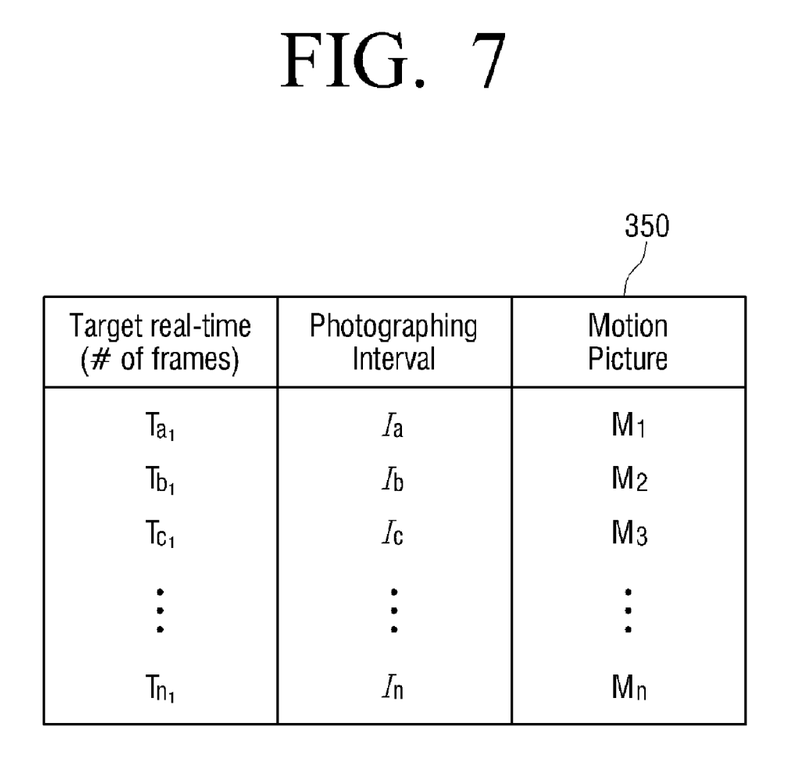
FIG. 7 is an illustration of an indexing according to an embodiment of the present general inventive concept.

FIG. 7 is an illustration of an indexing according to an embodiment of the present general inventive concept.

As illustrated in FIG. 7, for example, partial motion pictures $M_1$, $M_2$, $M_3$, ... $M_n$ are photographed at regular time intervals Ia, Ib, Ic, ... In according to the set photographing conditions $Ta_1$, $Tb_1$, $Tc_1$, ... $Tn_1$ and are stored in memory 350 according to respective indexes.

The present general inventive concept may also be embodied as computer-readable codes on a computer-readable medium. The computer-readable medium may include a computer-readable recording medium and a computer-readable transmission medium. The computer-readable recording medium is any data storage device that may store data that may be thereafter read by a computer system. Examples of the computer-readable recording medium include read-only memory (ROM), random-access memory (RAM), CD-ROMs, magnetic tapes, floppy disks, and optical data storage devices. The computer-readable recording medium may also be distributed over network coupled computer systems so that the computer-readable code is stored and executed in a distributed fashion. The computer-readable transmission medium may transmit carrier waves or signals (e.g., wired or wireless data transmission through the Internet). Also, functional programs, codes, and code segments to accomplish the present general inventive concept may be easily construed by programmers skilled in the art to which the present general inventive concept pertains.

Although various example embodiments of the present general inventive concept have been illustrated and described, it will be appreciated by those skilled in the art that changes may be made in these embodiments without departing from the principles and spirit of the present general inventive concept, the scope of which is defined in the appended claims and their equivalents.

What is claimed is:

1. An interval photographing method with a plurality of photographing conditions, the method comprising:
    setting at least one interval photographing condition including to a period and a real time in an interval photographing mode;
    obtaining an image at regular time intervals during the period according to the at least one set interval photographing condition;
    classifying the image obtained at the regular time intervals by an index according to the at least one set interval photographing condition and storing the image; and
    combining the image stored by the index and converting the image into a motion picture for the real time.

2. The interval photographing method as claimed in claim 1, wherein the at least one interval photographing condition includes at least one of brightness, aperture value, white balance, and special effect of photography, and
    wherein the obtaining the image includes obtaining an image at regular time intervals which are calculated based on a maximum time for interval photographing and a real time required to photograph.

3. The interval photographing method as claimed in claim 1, wherein the obtained image is a still image.

4. The interval photographing method as claimed in claim 1, wherein the obtained image is a partial motion picture.

5. The interval photographing method as claimed in claim 4, wherein the partial-motion picture is photographed at preset regular time intervals according to the at least one interval photographing condition.

6. The interval photographing method as claimed in claim 1, further comprising:
    displaying a maximum number of the at least one interval photographing conditions set by a user.

7. The interval photographing method as claimed in claim 6, wherein the maximum number of the at least one interval photographing conditions is obtained using a maximum photographing interval set by the user as the period and the real time to photograph within the set maximum photographing interval.

8. A photographing method, comprising:
    photographing an image at preset time intervals separately for each of different photographing conditions according to a period and a real time; and
    generating a motion picture for each of the different photographing conditions corresponding to the real time by combining the images photographed during the period according to the same photographing condition.

9. The photographing method as claimed in claim 8, wherein the photographing comprises:
    photographing a still image separately according to each of the different photographing conditions,
    wherein the generating the motion picture includes combining still images photographed according to the same photographing conditions.

10. The photographing method as claimed in claim 8, wherein the photographing comprises:
    photographing a partial motion picture separately according to each of the different photographing conditions,
    wherein the generating the motion picture includes combining partial motion pictures photographed according to the same photographing condition.

11. A photographing apparatus, comprising:
    a photographing unit to obtain an image at regular time intervals according to a total period and a real time according to at least one set interval photographing condition;
    a memory to classify the image obtained at the regular time intervals by an index during the total period according to the at least one set interval photographing condition, and store the image; and
    a control unit to combine the image stored by the index and convert the image into a motion picture to correspond to the real time.

12. The photographing apparatus as claimed in claim 11, wherein the at least one interval photographing condition includes at least one of brightness, aperture value, white balance, and special effect of photography.

13. The photographing apparatus as claimed in claim 11, wherein the imaging device obtains the image at the regular time intervals which are calculated based on a maximum time for interval photographing as the total period and the real time required to photograph.

14. The photographing apparatus as claimed in claim 11, wherein the obtained image is a still image.

15. The photographing apparatus as claimed in claim 11, wherein the obtained in image is a partial motion picture.

16. The photographing apparatus as claimed in claim 15, wherein the partial motion picture is photographed at preset regular time intervals according to the at least one interval photographing condition.

17. The photographing apparatus as claimed in claim 11, further comprising:
    a display to display a maximum number of the at least one interval photographing conditions set by a user during the real time.

18. The photographing apparatus as claimed in claim 17, wherein the maximum number of the at least one interval photographing conditions is obtained using a maximum photographing interval set by the user as the total period and the real time to photograph within the set maximum photographing interval.

19. A photographing apparatus, comprising:
    a photographing unit; and
    a control unit to determine a plurality of intervals to photograph an image according to an event period and a real time, to control the photographing unit to photograph the image according to the intervals during the event period, and to combine the images photographed according to the intervals to be played during the real time.

\* \* \* \* \*